UNITED STATES PATENT OFFICE.

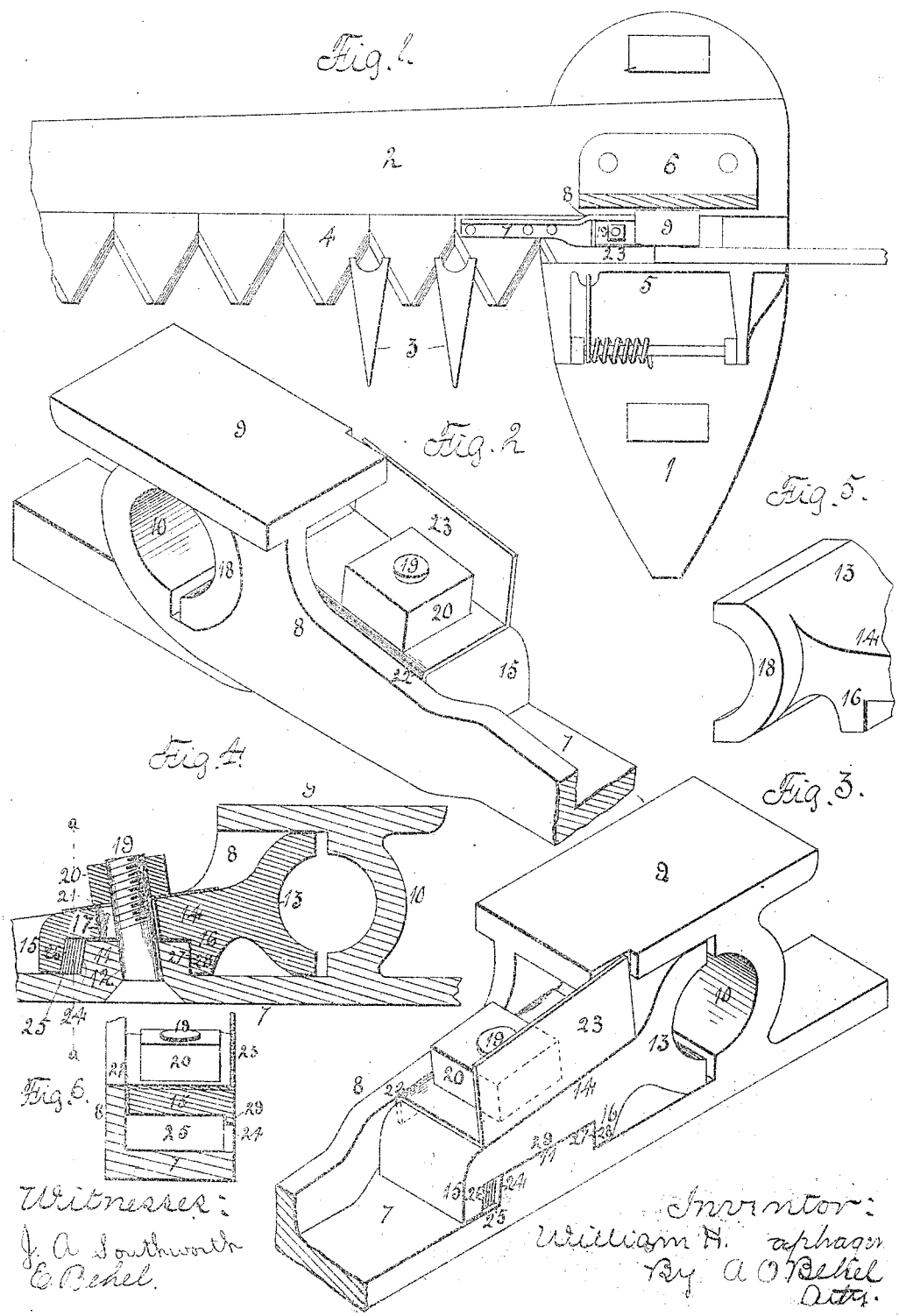

WILLIAM H. TRAPHAGEN, OF ROCKFORD, ILLINOIS, ASSIGNOR TO THE EMERSON MANUFACTURING COMPANY, OF SAME PLACE.

PITMAN CONNECTION.

SPECIFICATION forming part of Letters Patent No. 630,135, dated August 1, 1899.

Application filed April 22, 1898. Serial No. 678,501. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Pitman Connections for Harvesting-Machines, of which the following is a specification.

The object of this invention is to construct a knife-head to receive the pitman-hook having a stationary section and an adjustable section presenting means for taking up the wear of the parts, the adjustable section located at the grass or grain side of the pitman-hook.

In the accompanying drawings, Figure 1 is a plan view of an inner shoe of a mower cutting apparatus with the finger-bar, knife, and my improvements shown in connection therewith. Fig. 2 is an isometrical representation of my improved knife-head as seen from the rear. Fig. 3 is an isometrical representation of my improvements as seen from the front. Fig. 4 is a vertical lengthwise section through the knife-head. Fig. 5 is an isometrical representation of the semicircular end of the adjustable section of the knife-head. Fig. 6 is a vertical section on dotted line *a*, Fig. 4.

In harvesting-machines, more especially mowing-machines, a knife-head is secured to the inner end of the knife, to which the pitman is connected in order that the knife may be reciprocated. By the constant reciprocation of the knife the pitman-hook, forming a connection therewith, as well as the inner surfaces of the knife-head, is gradually wearing, and an adjustment must be provided to take up this wear. This has been accomplished in various ways; but so far as known to me the adjustable section has been located at the stubble side of the pitman-hook, thereby extending the length of the connection in that direction to such an extent that when the finger-bar was folded the end of the knife-head would only be a few inches from the ground where it would be damaged and rendered useless. My invention is intended to overcome these difficulties, which I accomplish by locating the adjustable section of the knife-head at the grass or grain side of the pitman-hook and of such construction as to prevent grass or grain from catching on the adjustable section.

In the accompanying drawings I have shown only such portions of a cutting apparatus of a mowing-machine as are necessary to show the application of my improvements.

The inner shoe 1 is of the usual construction, to which are secured the finger-bar 2, fingers 3, and knife 4. The usual clamp 6, holding the knife-head in operative position, and a pivoted latch 5, holding the pitman-hook in connection with the knife-head, are connected to the upper surface of the inner shoe.

My improved knife-head consists of the stationary portion composed of the base-plate 7, rear wall 8, top plate 9, semicircular wall 10, and raised projection 11, having an opening 12. The top plate 9 has a notch in its front face, as shown at Figs. 2 and 3. The adjustable section of the knife-head is composed of the semicircular end 13, provided with a shank 14, having its under face recessed, leaving projections 15 and 16, and an elongated opening 17 is formed through the shank 14. The semicircular end has an extension 18. A bolt 19 is passed up through the opening 12 in the base-plate, its head being countersunk and the shank of the bolt being located at right angles to the upper face of the shank 14 of the adjustable section of the knife-head, and when the base-plate of the stationary portion of the knife-head is secured to the knife the bolt is held from displacement. The adjustable section of the head is placed on the bolt, and a nut 20, turned on the bolt, will clamp the two sections of the head together. A nut-lock composed of a plate having an elongated opening 21 and a downturned edge 22 is located between the shank 14 of the adjustable section and the wall 8 of the stationary portion, and after the nut is turned down with sufficient firmness the edge 23 is turned up, thereby preventing the unscrewing of the nut. The inner face of the projection 15 and the edge 24 of the projection 11 are beveled, and between them is placed a series of thin metallic strips 25. From the front edge of the shank portion of the adjustable section depends a rib 29, which extends over the front ends of the metallic packing-strips, and should they become loosened they cannot drop out.

When the parts are in the position shown in the drawings, all of the metallic strips 25 are between the surfaces 24 and 26 and the surfaces 27 and 28 are in contact. When the pitman-hook is in the position between the semicircular surfaces, it will fill the opening, and after the parts become somewhat worn the edge 23 of the nut-lock is bent down sufficiently to allow the unscrewing of the nut 20, one or more of the metallic strips 25 are withdrawn from between the surfaces 24 and 26, and the adjustable section of the knife-head is moved toward the pitman-hook until the wear is taken up, and the spaces between the surfaces 24 and 26 and the surfaces 27 and 28 are filled with the metallic strips, when the nut is turned down, which will hold the metallic strips in position, and the strips removed from between the surfaces 24 and 26 will fill the spaces between the surfaces 27 and 28. By making the surfaces 24 and 26 inclined the metallic strips will be held from displacement, as the tighter the nut is turned down the closer will the strips be compacted.

It will be noticed that the force exerted on the head during its inward thrust will be received by the semicircular portion 10, which is a part of the base-plate 7, and the force of the outward thrust will be received by the semicircular portion 13 of the adjustable section of the knife-head and transmitted to the projection 11, forming a part of the base-plate, by reason of the projection 16 of the adjustable section lying in contact with the surface of the projection 11. Consequently no part of the force of the outward thrust will be received by the bolt 19, as the sole function of this bolt is to hold the adjustable section in connection with the stationary portion of the knife-head.

I claim as my invention—

1. In a cutting apparatus for harvesting-machines, a knife-head composed of a section secured to the knife, an adjustable section, a bolt connecting the sections and a fender for the nut of the bolt.

2. In a cutting apparatus for harvesting-machines, a knife-head composed of a section secured to the knife, and an adjustable section having a connection with the section secured to the knife-head, the connection consisting of a projection rising from the upper face of the base-plate secured to the knife, the under face of the adjustable section recessed, the recess being longer than the projection, and packing filling the space.

3. In a cutting apparatus for harvesting-machines, a knife-head composed of a section secured to the knife having a notch in its front face, an adjustable section, a bolt connecting the adjustable section having a projecting nut and a plate protecting the nut, a portion of which is located in the notch.

4. In a cutting apparatus for harvesting-machines, a knife-head composed of a section secured to the knife, and an adjustable section having a connection with the section secured to the knife, the under face of the adjustable section recessed receiving a projection extending from the under face of the section secured to the knife, and having a depending rib.

WILLIAM H. TRAPHAGEN.

Witnesses:
 A. O. BEHEL,
 E. BEHEL.